United States Patent
Ogura et al.

(10) Patent No.: US 9,623,513 B2
(45) Date of Patent: Apr. 18, 2017

(54) LASER WELDING INSPECTION APPARATUS AND LASER WELDING INSPECTION METHOD

(71) Applicant: TOYOTA JIDOSHA KABUSHIKI KAISHA, Toyota-shi, Aichi (JP)

(72) Inventors: Shuhei Ogura, Nagakute (JP); Yuta Iwamoto, Toyota (JP); Atsushi Kawakita, Miyoshi (JP); Hiroaki Kishi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/659,994

(22) Filed: Mar. 17, 2015

(65) Prior Publication Data

US 2015/0266131 A1 Sep. 24, 2015

(30) Foreign Application Priority Data

Mar. 20, 2014 (JP) .................................. 2014-59232

(51) Int. Cl.
*G01N 21/00* (2006.01)
*B23K 26/03* (2006.01)
*B23K 31/12* (2006.01)
*B23K 26/22* (2006.01)

(52) U.S. Cl.
CPC ............ *B23K 26/032* (2013.01); *B23K 26/22* (2013.01); *B23K 31/125* (2013.01)

(58) Field of Classification Search
CPC ............... G01N 21/9501; G01N 21/94; G01N 21/8806; G01N 21/956; G01N 21/95607

USPC ....................................................... 356/237.2
See application file for complete search history.

(56) References Cited

U.S. PATENT DOCUMENTS

| 6,285,002 B1 * | 9/2001 | Ngoi et al. ............... 219/121.73 |
| 2002/0015088 A1 * | 2/2002 | Inoue ......................... B41J 2/45 347/238 |
| 2002/0158053 A1 * | 10/2002 | Kessler ................ B23K 26/034 219/121.83 |

(Continued)

FOREIGN PATENT DOCUMENTS

| DE | 4203667 A1 | 8/1993 |
| JP | 2005-021949 A | 1/2005 |

(Continued)

*Primary Examiner* — Tarifur Chowdhury
*Assistant Examiner* — Md M Rahman
(74) *Attorney, Agent, or Firm* — Oliff PLC

(57) ABSTRACT

Provided is a laser welding inspection apparatus capable of improving the accuracy for determining the welding defect. The laser welding inspection apparatus includes a head which irradiates a welded portion of a workpiece with a laser beam for inspection, an optical receiver which receives a return light of the laser beam for inspection from the welded portion, an optical system which adjusts at least a focal diameter of the laser beam for inspection applied to the welded portion and a region where the return light from the welded portion is recognized, and a controller which controls the optical system and determines, based on intensity of the return light, whether a welding defect exists in the welded portion. The controller controls the optical system so that a diameter of the region is not more than 1.5 times as large as the focal diameter.

7 Claims, 3 Drawing Sheets

(56) References Cited

U.S. PATENT DOCUMENTS

| | | | |
|---|---|---|---|
| 2004/0245227 A1* | 12/2004 | Grafton-Reed | B23K 26/032 219/121.83 |
| 2006/0245084 A1* | 11/2006 | Brustle | B23K 26/046 359/744 |
| 2012/0255937 A1* | 10/2012 | Oe | B23K 26/0884 219/121.63 |
| 2012/0285936 A1* | 11/2012 | Urashima et al. | 219/121.63 |

FOREIGN PATENT DOCUMENTS

| | | |
|---|---|---|
| JP | 2007-098442 A | 4/2007 |
| JP | 2007-326134 A | 12/2007 |
| JP | 2012-035307 A | 2/2012 |
| JP | 2012-213806 A | 11/2012 |
| JP | 5671873 B2 | 2/2015 |

\* cited by examiner 0.7 × focal diameter D1 ≤ monitor diameter D2 ≤ 1.5×focal diameter D1

LASER WELDING INSPECTION APPARATUS AND LASER WELDING INSPECTION METHOD

TECHNICAL FIELD

The present invention relates to a technique for a laser welding inspection apparatus and a laser welding inspection method.

BACKGROUND ART

Laser beam welding is a technique for irradiating a workpiece (for example, two steel plates) with a laser beam to locally melt and solidify the workpiece, thereby joining the workpiece. Laser welding inspection is an inspection for determining whether a welding defect exists in a welded portion of the workpiece which is formed by the laser beam welding.

There is publicly known a laser welding inspection which includes irradiating the welded portion of the workpiece with a laser beam for inspection, receiving a return light of the laser beam for inspection from the welded portion, and determining, based on intensity of the return light, whether the welding defect exists in the welded portion. For example, JP-A 2012-213806 discloses a laser welding inspection for determining whether the welding defect exists in the welded portion by a time-periodical change in intensity of the return light.

In the laser beam welding, there is generated a phenomenon in which, when the welded portion is irradiated with the laser beam for inspection, metallic vapor is generated near a laser irradiation point, and the generated metallic vapor flutters in a smoking manner from the welded portion.

The return light is also generated from the metallic vapor.

Therefore, in the conventional laser welding inspection disclosed in JP-A 2012-213806, when the return light generated from the metallic vapor is detected for a large region (monitor diameter) where the return light is recognized in the welded portion relative to the laser focal diameter, the detected return light from the metallic vapor has an influence on the time-periodical change, which results in a risk of falsely determining whether the welding defect exists in the welded portion.

Thus, in the conventional laser welding inspection, sometimes the false determination of the welding defect is made. Therefore, an unmanned laser welding inspection step has not been performed yet. In the laser welding inspection, there is a demand for improving accuracy for determining the welding defect without detecting the return light generated from the metallic vapor.

SUMMARY OF INVENTION

Problem to be Solved by the Invention

An object of the present invention is to provide a laser welding inspection apparatus and a laser welding inspection method capable of improving the accuracy for determining the welding defect.

Means for Solving the Problem

The problem to be solved by the present invention is described above, and means for solving the problem will be described below.

A first aspect of the present invention is a laser welding inspection apparatus including a head which irradiates a welded portion of a workpiece with a laser beam for inspection, an optical receiver which receives a return light of the laser beam for inspection from the welded portion, an optical system which adjusts at least a focal diameter of the laser beam for inspection applied to the welded portion and a region where the return light from the welded portion is recognized, and a controller which controls the optical system and determines, based on intensity of the return light, whether a welding defect exists in the welded portion. The controller controls the optical system so that a diameter of the region where the return light from the welded portion is recognized is not more than 1.5 times as large as the focal diameter.

A second aspect of the present invention is a laser welding inspection method including a step for irradiating a welded portion of a workpiece with a laser beam for inspection, a step for receiving a return light of the laser beam for inspection from the welded portion, and a step for determining, based on intensity of the return light, whether a welding defect exists in the welded portion. A diameter of a region where the return light from the welded portion is recognized is not more than 1.5 times as large as a focal diameter of the laser beam for inspection applied to the welded portion.

Effects of the Invention

The laser welding inspection apparatus and the laser welding inspection method of the present invention make it possible to improve the accuracy for determining the welding defect.

DESCRIPTION OF EMBODIMENTS

A configuration of a laser welding inspection apparatus 100 will be described with reference to FIG. 1.

Figure 1:
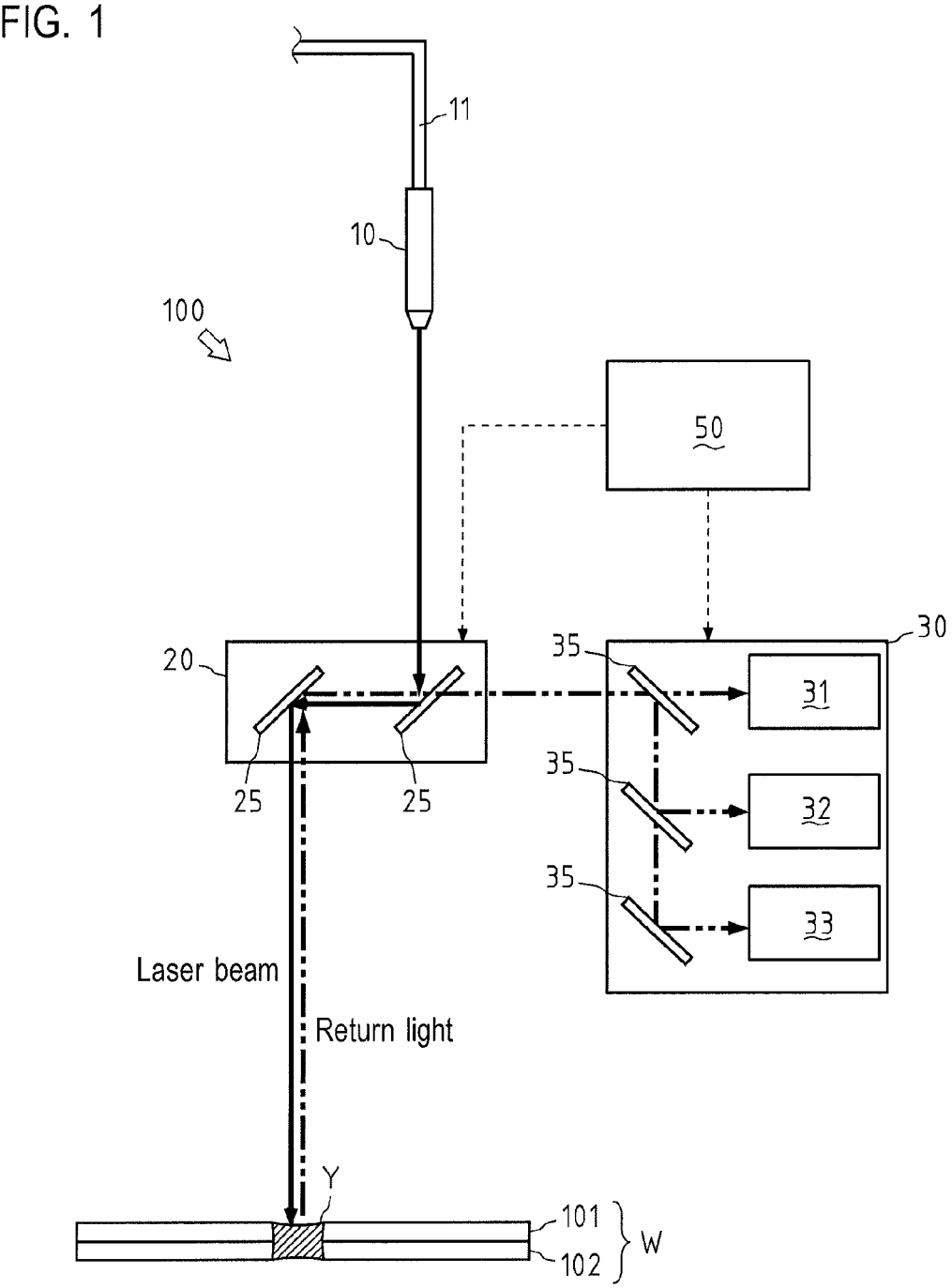
FIG. 1 is a schematic diagram illustrating a configuration of a laser welding inspection apparatus.

FIG. 1 schematically illustrates the configuration of the laser welding inspection apparatus 100. Further, in FIG. 1, for the sake of convenience, an irradiation laser beam is indicated by a solid line, a return light is indicated by an alternate long and tow short dashes line, and an electric signal line is indicated by a broken line.

The laser welding inspection apparatus 100 is a laser welding inspection apparatus according to an embodiment of the present invention.

The laser welding inspection apparatus 100 determines whether a welding defect exists in a welded portion Y of a workpiece W which is formed by the laser beam welding.

The laser welding inspection apparatus 100 is used as a usual laser beam welding apparatus, and the laser welding inspection apparatus 100 is used as a laser beam welding apparatus by irradiating a workpiece with a welding laser beam while used as a laser welding inspection apparatus by irradiating a welded portion with a laser beam for inspection (to be described later).

In the present embodiment, it is assumed that the workpiece W is one in which two steel plates 101 and 102 overlap each other, and that the laser welding inspection apparatus 100 irradiates the workpiece W with the welding laser beam to form a welded portion Y.

The laser welding inspection apparatus 100 includes a head 10, an optical system 20, an optical receiver 30, and a controller 50.

The head 10 is oscillated by a laser oscillator (not illustrated), and irradiates the workpiece W with the laser beam for inspection guided by an optical path 11. In the optical path 11, the laser beam for inspection is folded by a mirror and transmitted, or the laser beam for inspection is freely curved by an optical fiber and transmitted.

The optical system 20 includes a plurality of mirrors 25. The optical system 20 adjusts the mirrors 25 to focus the laser beam for inspection applied to the welded portion Y from the head 10 so that the laser beam for inspection has a proper size, and to scan the workpiece W with the laser beam for inspection.

The optical system 20 adjusts the mirrors 25 to adjust a focal diameter D1 of the laser beam in the welded portion Y of the workpiece W. Additionally, the optical system 20 adjusts the mirrors 25 to adjust a diameter of a region (hereinafter, referred to as a monitor diameter D2) where the return light from the welded portion Y of the workpiece W is recognized.

Figure 2:
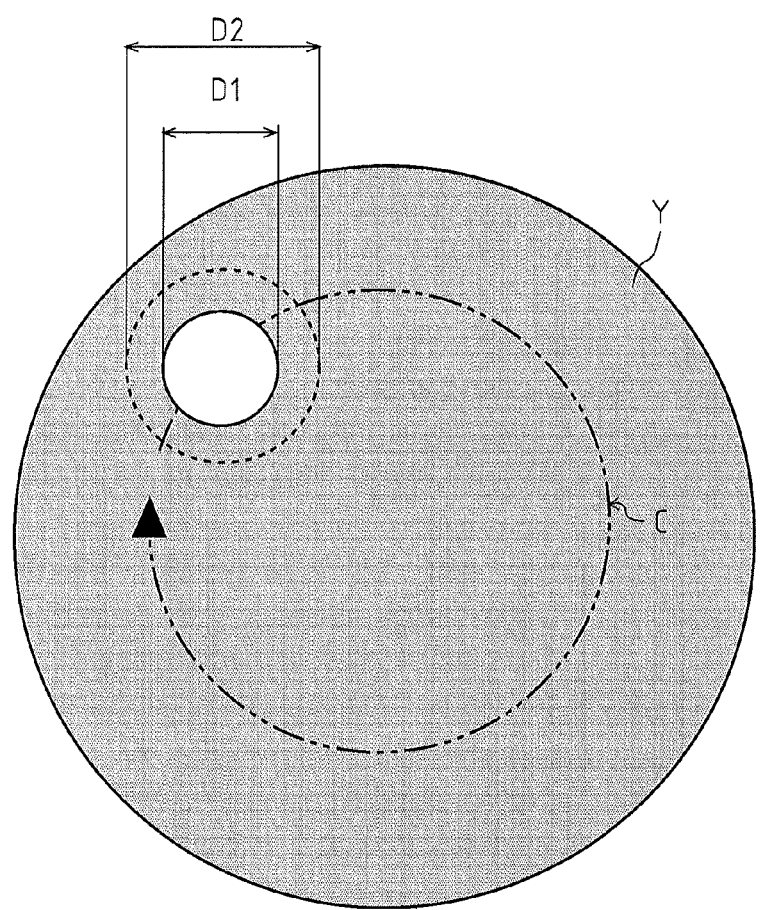
FIG. 2 is a schematic diagram showing a relationship between a focal diameter and a monitor diameter.

In other words, the optical system 20 of the present embodiment adjusts at least the focal diameter D1 of the laser beam for inspection in the welded portion Y and the monitor diameter D2 in which the return light from the welded portion Y is recognized (see FIG. 2).

The optical receiver 30 receives the return light of the laser beam for inspection from the welded portion Y, and receives and recognizes the return light from the monitor diameter D2 in the welded portion Y. The optical receiver 30 includes a plurality of mirrors 35, a laser beam receiver 31, a plasma receiver 32, and an infrared receiver 33.

The laser beam (having a wavelength of approximately 1060 nm) that has not been absorbed by the welded portion Y is folded by the mirror 35, and received by the laser beam receiver 31.

A plasma (having a wavelength of 1100 nm or more) generated by metallic vaporization from a keyhole (a recess of the welded portion Y) is folded by the mirror 35, and received by the plasma receiver 32.

An infrared beam (having a wavelength of 600 nm or less) generated by radiation of molten metal heat of the welded portion Y is folded by the mirror 35, and received by the infrared receiver 33.

The controller 50 is connected to the optical system 20 and the optical receiver 30. The controller 50 has a function of controlling the optical system 20. The controller 50 also has a function of determining, based on intensity of the return light received by the optical receiver 30, whether the welding defect exists in the welded portion Y.

A relationship between the focal diameter D1 and the monitor diameter D2 will be described with reference to FIG. 2.

FIG. 2 schematically shows the relationship between the focal diameter D1 and the monitor diameter D2 in a planar view. Further in FIG. 2, the focal diameter D1 is indicated by a solid line, the monitor diameter D2 is indicated by a broken line, and a scanning locus C is indicated by an alternate long and two short dashes line. The scanning locus C is a locus of the laser beam for inspection when the workpiece W is scanned with the laser beam for inspection.

The laser welding inspection apparatus 100 of the present embodiment moves the laser beam for inspection along the circular scanning locus C four times in the welded portion Y, and determines, by the time-periodical change in intensity of the return light, whether the welding defect exists in the welded portion Y.

It is notable that in the laser welding inspection apparatus 100 of the present embodiment, the controller 50 adjusts the optical system 20 so that the monitor diameter D2 becomes not more than 1.5 times as large as the focal diameter D1, and that the monitor diameter D2 becomes not less than 0.7 times as large as the focal diameter D1.

A flow of a laser welding inspection step S100 will be described with reference to FIG. 3.

Figure 3:
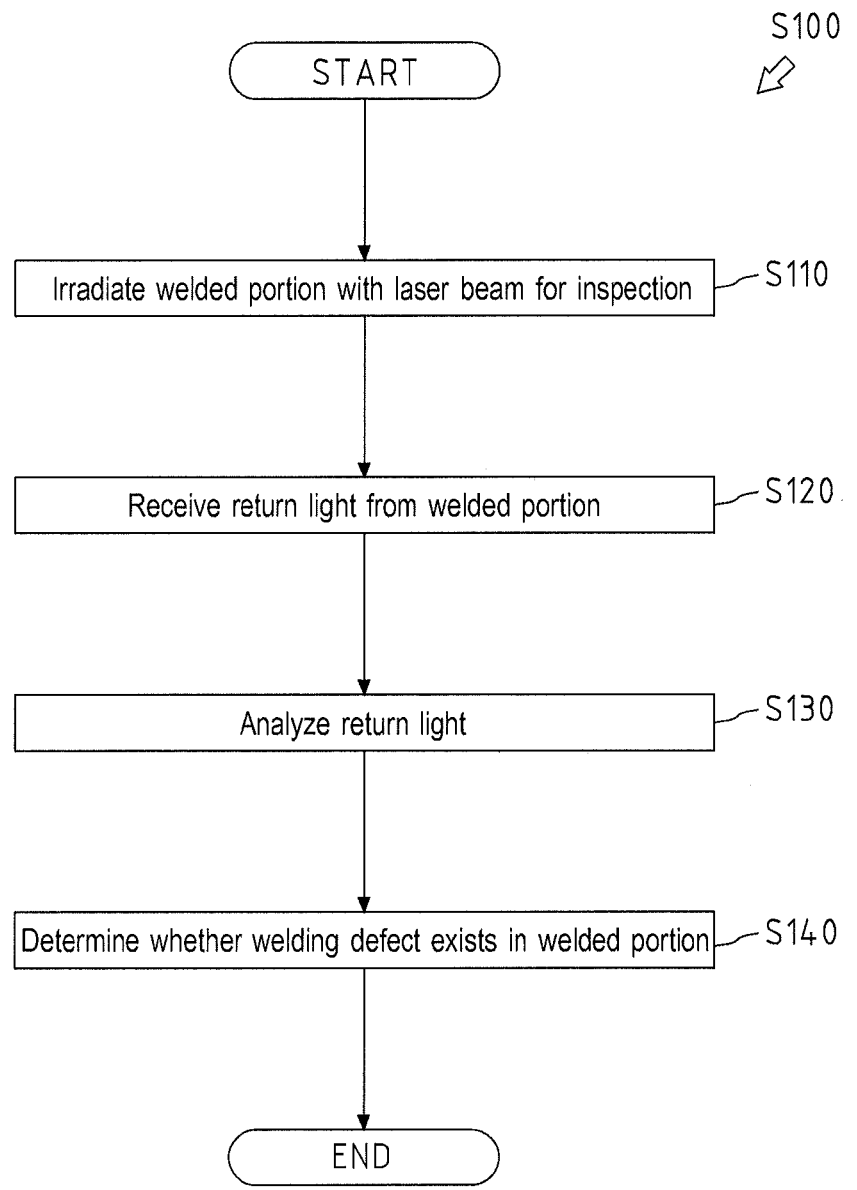
FIG. 3 is a flowchart showing a flow of a laser welding inspection step.

FIG. 3 is a flowchart showing the flow of the laser welding inspection step S100.

The laser welding inspection step S100 is a laser welding inspection method according to an embodiment of the present invention. The laser welding inspection step S100 is an inspection step for determining, by use of the laser welding inspection apparatus 100, whether the welding defect exists in the welded portion Y of the workpiece W which is formed by the laser beam welding.

In Step S110, the controller 50 adjusts the optical system 20 to irradiate the welded portion Y with the laser beam for inspection having the predetermined focal diameter D1 At this point, as described above, the controller 50 adjusts the optical system 20 to cause the laser beam for inspection to make a circuit along the circular scanning locus C four times.

In Step S120, the optical receiver 30 receives the return light of the laser beam for inspection in the welded portion Y (circular scanning locus C).

At this time, as described above, in order to prevent the reception of the return light in the excessive region, the controller 50 adjusts the optical system 20 so that the monitor diameter D2 becomes not more than 1.5 times as large as the focal diameter D1. The metallic vapor is generated near the laser irradiation point, the generated metallic vapor flutters in a smoking manner from the welded portion Y, and the return light is also generated from the metallic vapor. However, the optical receiver 30 can be prevented from detecting the return light from the metallic vapor.

In Step S130, the controller 50 analyzes the intensity of the return light of the laser beam for inspection in the welded portion Y (circular scanning locus C).

In Step S140, the controller 50 determines whether the welding defect exists in the welded portion Y by the time-periodical change in intensity of the return light. Specifically, the controller 50 determines that the welding defect (a hole or a one-side collapse) exists if a portion at which the intensity is significantly low exists periodically in the time-periodical change in intensity of the return light (in the case of moving the laser beam for inspection along the circular scanning locus C four times).

Effects of the laser welding inspection apparatus 100 and laser welding inspection step S100 will be described below.

The laser welding inspection apparatus 100 and the laser welding inspection step S100 make it possible to improve the accuracy for determining the welding defect.

Specifically, in the laser welding inspection apparatus 100 and the laser welding inspection step S100, the controller 50 adjusts the optical system 20 so that the monitor diameter D2 becomes not more than 1.5 times as large as the focal diameter D1, thus enabling to reduce the influence of the metallic vapor generated near the laser irradiation point to improve the accuracy for determining the welding defect.

REFERENCE SIGNS LIST

10: head
20: optical system
30: optical receiver
50: controller
100: laser welding inspection apparatus
D1: focal diameter
D2: monitor diameter
Y: welded portion

What is claimed is:

1. A laser welding inspection apparatus comprising:
 a head that is configured to irradiate a welded portion of a workpiece with a laser beam for inspection;
 an optical receiver that is configured to receive a return light of the laser beam for inspection from the welded portion, the return light of the laser beam being defined as a light that is not absorbed at the welded portion and is reflected by the welded portion when the welded portion is irradiated with the laser beam;
 an optical system that is configured to adjust (i) at least a focal diameter of the laser beam for inspection applied to the welded portion, and (ii) a diameter of a region of the welded portion from where the return light is recognized; and
 a controller that is configured to control the optical system and determines, based on intensity of the return light, whether a welding defect exists in the welded portion, wherein
 the controller controls the optical system so that the diameter of the region of the welded portion from where the return light is recognized is not more than 1.5 times as large as the focal diameter, and
 the controller controls the optical system so that the diameter of the region where the return light from the welded portion is recognized is not less than 0.7 times as large as the focal diameter.

2. The laser welding inspection apparatus according to claim 1, wherein the optical system includes a plurality of mirrors.

3. The laser welding inspection apparatus according to claim 2, wherein the controller is configured to adjust the plurality of mirrors so as to adjust the focal diameter of the laser beam and the diameter of the region where the return light from the welded portion is recognized.

4. The laser welding inspection apparatus according to claim 1, wherein the optical receiver includes a plurality of mirrors, a laser beam receiver, a plasma receiver, and an infrared receiver.

5. The laser welding inspection apparatus according to claim 1, wherein the welded portion of the workpiece is irradiated with the laser beam along a circular scanning locus.

6. The laser welding inspection apparatus according to claim 5, wherein the welded portion of the workpiece is irradiated with the laser beam along the circular scanning locus at least four times.

7. A laser welding inspection method comprising:
 a step for irradiating a welded portion of a workpiece with a laser beam for inspection;
 a step for receiving a return light of the laser beam for inspection from the welded portion, the return light of the laser beam being defined as a light that is not absorbed at the welded portion and is reflected by the welded portion when the welded portion is irradiated with the laser beam;
 a step for adjusting (i) at least a focal diameter of the laser beam for inspection applied to the welded portion, and (ii) a diameter of a region of the welded portion from where the return light is recognized; and
 a step for determining, based on intensity of the return light, whether a welding defect exists in the welded portion, wherein
 the diameter of the region of the welded portion from where the return light is recognized is not more than 1.5 times as large as the focal diameter of the laser beam for inspection applied to the welded portion, and
 the controller controls the optical system so that the diameter of the region where the return light from the welded portion is recognized is not less than 0.7 times as large as the focal diameter.

* * * * *